(12) United States Patent
Kojima

(10) Patent No.: US 7,975,991 B2
(45) Date of Patent: Jul. 12, 2011

(54) GAS-LIQUID CONTACT SYSTEM

(75) Inventor: Hisao Kojima, Yokohama (JP)

(73) Assignee: Anemos Company Ltd., Toyko (JP)

( * ) Notice: Subject to any disclaimer, the term of this patent is extended or adjusted under 35 U.S.C. 154(b) by 844 days.

(21) Appl. No.: 12/013,199

(22) Filed: Jan. 11, 2008

(65) Prior Publication Data

US 2008/0169576 A1 Jul. 17, 2008

(30) Foreign Application Priority Data

Jan. 15, 2007 (JP) ................................ 2007-005883

(51) Int. Cl.
*B01D 47/00* (2006.01)
*B01F 3/04* (2006.01)
(52) U.S. Cl. ....... 261/79.2; 261/113; 261/116; 261/117; 261/96; 96/296; 366/339
(58) Field of Classification Search ................ 261/79.2, 261/94, 96, 113, 115–117; 96/234, 274, 96/277, 290, 296, 326; 95/149; 55/443, 55/456; 366/338–340
See application file for complete search history.

(56) References Cited

U.S. PATENT DOCUMENTS

| | | | | |
|---|---|---|---|---|
| 2,354,674 A | * | 8/1944 | Fisher | 261/21 |
| 2,409,088 A | * | 10/1946 | Weits et al. | 96/319 |
| 3,297,305 A | * | 1/1967 | Walden | 366/101 |
| 3,358,413 A | * | 12/1967 | Kalika | 96/282 |
| 3,853,515 A | * | 12/1974 | Davis | 96/358 |
| 3,856,487 A | * | 12/1974 | Perez | 96/240 |
| 3,971,642 A | * | 7/1976 | Perez | 96/250 |
| 4,484,937 A | * | 11/1984 | James et al. | 96/234 |
| 6,431,528 B1 | * | 8/2002 | Kojima | 261/79.2 |
| 7,056,367 B2 | * | 6/2006 | Trivett | 95/226 |
| 7,510,172 B2 | * | 3/2009 | Kojima | 261/79.2 |

FOREIGN PATENT DOCUMENTS

| | | |
|---|---|---|
| JP | 06-042733 | 2/1994 |
| JP | 8-229341 | 9/1996 |
| JP | 2000-202234 | 7/2000 |
| JP | 2001-62269 | 3/2001 |
| JP | 2004-181437 | 7/2004 |
| JP | 2005-219036 | 8/2005 |
| JP | 1304540 | 6/2007 |

OTHER PUBLICATIONS

Japanese Office Action for corresponding JP Application No. 2007-005883, Jan. 25, 2011.

* cited by examiner

*Primary Examiner* — Frank M Lawrence
(74) *Attorney, Agent, or Firm* — Dittavong Mori & Steiner, P.C.

(57) ABSTRACT

Disclosed is a gas-liquid contact system. The system includes a vessel arranged approximately perpendicular to the ground in a longitudinal direction, a static fluid mixer in the vessel having a passage tube and a spiral blade provided in the passage tube, a gas supplier supplying gas having foreign substances to the static fluid mixer from a lower end of the vessel, a gas discharger discharging the gas passed through the static fluid mixer from an upper end of the vessel, a first liquid supplier supplying liquid to the static fluid mixer, and a liquid discharger discharging the liquid supplied from the first liquid supplier outside of the vessel. In the system, the gas supplier includes a gas generator generating gas, a pipe connecting the gas generator with the vessel, a blowing device provided in the pipe, and a second liquid supplier supplying liquid to the pipe between the gas generator and the blowing device.

14 Claims, 8 Drawing Sheets

GAS-LIQUID CONTACT SYSTEM

CROSS-REFERENCES TO RELATED APPLICATIONS

The present invention contains subject matter related to Japanese Patent Application JP2007-005883, filed in the Japanese Patent Office on Jan. 15, 2006, the entire contents of which are incorporated herein by reference.

BACKGROUND OF THE INVENTION

1. Field of the Invention

This invention generally relates to gas-liquid contact systems used in the separation of foreign substances in a gas phase by allowing particulate matter such as solid particles or liquid particles contained in the gas phase to contact with a liquid phase to be trapped or dissolved the particles therein. Specifically, this invention is concerned with a gas-liquid contact system utilized for purifying and defecating a gas phase by trapping and dissolving foreign substances in the liquid phase to separate from the gas phase. In the gas-liquid contact system, the foreign substances in the gas phase including minute solid particles such as burned ash, unburned carbon, silicon dioxides, zinc oxides, aluminum oxides, and silicon nitride are allowed to contact with the liquid phase so that the foreign substances contained in the substances are trapped in the liquid phase and separated from the gas phase, or the foreign substances contained in the gas phase including entrained mist such as a droplet or sulfuric acid are allowed to contact with the liquid phase so that the foreign substances in the substances are trapped and dissolved in the liquid phase, thereby purifying and defecating the gas phase.

2. Description of the Related Art

Known related-art gas-liquid systems utilized for the separation of foreign substances from a gas phase include gravitational, inertial, centrifugal force, cleaning, filtered, electric, and sonic types.

The gravitational, inertial, and centrifugal-forcing gas-liquid systems usually exhibit low separation efficiency in separating minute solid particles from the gas, each having a diameter of 1 μm or less. If separating the minute solid particles, in particular, from a hydrated gas, a significant pressure loss or clogging may be observed in such systems due to the accretion of the minute solid particles. These types of systems generally require repair and maintenance cost accordingly.

As an example of the cleaning gas-liquid system, a venturi scrubber can be given; however, the venturi scrubber generally exhibits pressure drop of 300 to 1200 mmH20 (3 to 12 kPa), which results in high power expenses.

As an example of the filtering system having filter fabric, a bag filter can be given; however, when filtering solid particles having high adhesive properties or hydrated gases with the bag filter, the filter fabric of the filtering system tends to be clogged with these particles in a short time, thereby resulting in high repair and maintenance cost.

A typical electric dust collecting system consumes a high voltage power supply, which requires high electric power expenses. In addition, the maintenance cost needs preparing for clearing or collecting the attached solid particles from a dust collecting electrode.

In view of the aforementioned factors, Japanese Unexamined Patent Application Publication No. 2004-181437 discloses a separator for foreign substances (also called a "gas-liquid contact system") having a static fluid mixer arranged approximately perpendicular to the ground in a longitudinal direction, a first supplier supplying liquid from an upper end to an inside of the static fluid mixer, and a second supplier supplying gas containing foreign substances from a lower end to the inside of the static fluid mixer. The static fluid mixer includes a passage tube through which a fluid is caused to flow, and at least one mixing element having at least one spiral blade placed in the passage tube, and the passage tube and the mixing element are continuously arranged in the longitudinal direction. In the static fluid mixer, liquid flows downwardly while gas flows upwardly, thereby causing the liquid and gas to be mutually in contact.

SUMMARY OF THE INVENTION

In general, a blowing device such as a blower is utilized for increasing efficiency in supplying gas containing foreign substances to a static fluid mixer in the gas-liquid contact system. The gas usually contains particulates such as dust particulates, and the particulates tend to be attached to the surface of a blade or inner-wall of the blowing device. The longer the operation time of the system is, the more the particulates will aggregate, coarsen, and grow to attach to the surface of the blade or inner-wall of the blowing device.

In particular, since the hydrated gas contains the droplet-attached particulates, the particulates have increased sizes due to the increased humidity. Accordingly, the blowing devices or pipes may need replacing in a short period, and hence the system may not be able to be running continuously.

Embodiments of the invention have attempted to provide a gas-liquid system capable of continuously running in a long period without replacing the blowing device or pipe.

Thus, the following embodiments have been disclosed.

A gas-liquid contact system according to an embodiment of the invention includes a vessel arranged approximately perpendicular to the ground in a longitudinal direction, a static fluid mixer in the vessel having a passage tube and a spiral blade provided in the passage tube, a gas supplier supplying a gas having foreign substances to the static fluid mixer from the lower end of the vessel, a gas discharger discharging the gas passed through the static fluid mixer from an upper end of the vessel, a first liquid supplier supplying liquid to the static fluid mixer, and a liquid discharger discharging the liquid supplied from the first liquid supplier outside of the vessel. In the system, the gas supplier includes a gas generator generating gas, a pipe connecting the gas supplier with the vessel, a blowing device provided in the pipe, and a second liquid supplier supplying liquid to the pipe between the gas generator and the blowing device.

In the gas-liquid contact system according to the embodiment of the invention, the second liquid supplier includes a spray nozzle member providing the liquid in the pipe in a spray form or in a vaporous form.

A gas-liquid contact system according to an embodiment of the invention includes a vessel arranged approximately perpendicular to the ground in a longitudinal direction, a first static fluid mixer in the vessel having a passage tube and a spiral blade provided in the passage tube, a gas supplier supplying gas having foreign substances to the first static fluid mixer from a lower end of the vessel, a first liquid supplier supplying liquid to the first static fluid mixer, and a liquid discharger discharging the liquid supplied from the first liquid supplier outside of the vessel. In the system, the gas supplier includes a gas generator generating gas, a pipe connecting the gas generator with the vessel, a blowing device provided in the pipe, and a second liquid supplier supplying liquid to the pipe between the gas generator and the blowing device.

In the gas-liquid contact system according to the embodiment, the first liquid supplier further includes an upper spray nozzle member supplying the liquid to the static fluid mixer from the upper part of the vessel, and a lower spray nozzle member supplying the liquid to the static fluid mixer from the lower part of the vessel.

In the gas-liquid contact system according to the embodiment, a nozzle of the lower spray nozzle member is arranged with facing the static fluid mixer.

In the gas-liquid contact system according to the embodiment, the liquid discharger includes a pipe provided in a side-wall of the vessel.

In the gas-liquid contact system according to the embodiment, the amount of the liquid supplied from the first liquid supplier to the vessel is in a range of approximately 0.1 to 20 L/m$^3$ with the liquid-to-gas ratio, based on the amount of the gas supplied from the gas supplier to the vessel.

In the gas-liquid contact system according to the embodiment, the amount of the spray liquid or vaporous liquid supplied from the second liquid supplier to the blowing device is in a range of approximately 0.01 to 0.5 vol %, based on the amount of the gas supplied from the gas supplier to the blowing device.

In the gas-liquid contact system according to the embodiment, the surface tension of the liquid supplied from the first liquid supplier and the second liquid supplier is approximately $73*10^{-3}$ N/m or less.

In the gas-liquid contact system according to the embodiment, the liquid supplied from the first liquid supplier and the second liquid supplier contains a surfactant.

In the gas-liquid contact system according to the embodiment, the content of the surfactant in the liquid supplied from the first liquid supplier and the second liquid supplier is in a range of approximately 0.001 to 5.0 wt %.

In the gas-liquid contact system according to the embodiment, the vessel has an inverted tapered shape in which the upper part of the vessel gradually increases in a radial sectional area in an upward direction.

According to the gas-liquid contact system of the embodiments, since the second liquid supplier is configured to supply liquid such as cleaning liquid to exhaust gas before the exhaust gas reaches the blowing device, thereby eliminating the foreign substances from the gas successfully. Consequently, the amount of the foreign substances attached to the blowing device or pipes can decrease, and hence the system can continuously be running in a long time without replacing the blowing device or pipe.

DESCRIPTION OF THE PREFERRED EMBODIMENTS

Embodiments of the fluid mixer of the present invention will be described with reference to accompanied drawings; however, the invention is not limited to the following embodiments.

First Embodiment

A first embodiment of the invention is described as follow.

Figure 1:
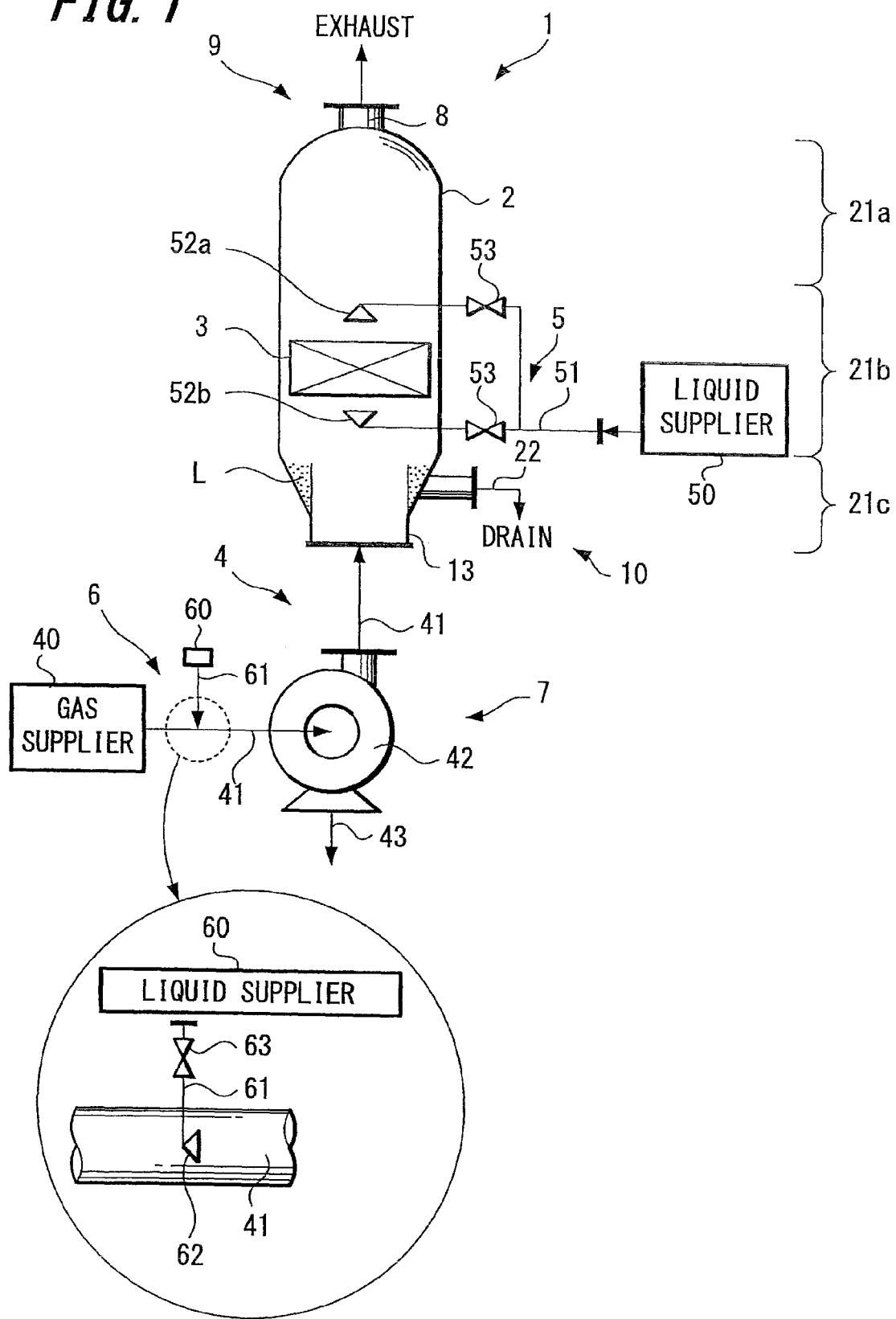
FIG. 1 is a schematic diagram illustrating a gas-liquid contact system according to an embodiment of the invention.

FIG. 1 is a schematic diagram illustrating a gas-liquid contact system according to the first embodiment of the invention. FIG. 1 shows the gas-liquid contact system 1 according to the first embodiment of the invention including a vessel 2, a static fluid mixer 3, a gas supplier 4, a first liquid supplier 5, a second liquid supplier 6, a blowing device 7, a gas discharger 9, and a liquid discharger 10.

In the system of the embodiment, the static fluid mixer 3 configured as described later is placed such that the longitudinal direction of the mixer 3 is perpendicular to internal side-walls of the sealed vessel 2. In this embodiment, the vessel 2 includes a separation-drip unit 21a placed at the upper part of the vessel 2 for separating liquid from gas and causing to drop the resulting liquid, and a reservoir 21c at the lower part of the vessel 2 for collecting the dropped liquid. The vessel 2 further includes a gas-liquid contact unit 21b between the separation-drip unit 21a and the reservoir 21c.

The gas-liquid contact unit 21b in the vessel 2 includes the static fluid mixer 3, and the first liquid supplier 5 for supplying liquid to the static fluid mixer 3. The first liquid supplier 5 includes a pipe 51 connected to a liquid supply source 50, and a spray nozzle member 52 in the vessel 2. In the embodiment of the system, the pipe 51 diverges in two directions; that is, the upper and lower parts of the static fluid mixer 3 in the vessel 2, at the respective ends of which the spray nozzle members 52a, 52b are provided. A nozzle of the upper spray nozzle member 52a is (downwardly) arranged in the direction towards the static fluid mixer 3, while a nozzle of the lower spray nozzle member 52b is (upwardly) arranged in the direction towards the static fluid mixer 3. Notice that a plurality of spray nozzle members 52 may be arranged in radial directions of the vessel 2.

In the embodiment, since cleaning liquid supplied from the liquid supply source 50 is supplied from both sides of the static fluid mixer 3, the proportion of the gas-liquid contact may increase, thereby increasing separation efficiency. The diverged pipe 51 includes a flow control valve 53 controlling the amount of the cleaning liquid flowing in the pipe 51. The spray nozzle members 52 each spray to supply the cleaning liquid having a droplet diameter of 100 to 5000 μm. Tap water may be used as the cleaning liquid. Alternatively, liquid having high wettability with foreign substances or liquid having low surface tension may preferably be used as the cleaning liquid.

The gas in the static fluid mixer 3 from which the foreign substances are separated is discharged outside of the system 1 via an exhaust pipe 8.

A drainage pipe 22 is connected to the reservoir 21c placed at the lower part of the vessel 2. The drainage pipe 22 is placed in an outer side-wall of the vessel 2 so that liquid L stored in a void between the side-walls of the vessel 2 and an inlet pipe 13 in the vessel is discharged outside of the vessel 2 via the drainage pipe 22.

The gas supplier 4 for supplying gas to the static fluid mixer 3 is provided at the lower end of the vessel 2. The gas supplier 4 includes a pipe 41 transferring gas or exhaust gas from a gas supply source 40 into the vessel 2, and a blower 42 utilized as a blowing device connected to the pipe 41. In the gas supplier 4, the pipe 41 is connected to the gas supply source 40 via the blower 42. The gas supplier 4 supplies the exhaust gas from the supply source 40 by rotating blades of the blower 42 utilized as the blowing device into the static fluid mixer 3 via the inlet pipe 13 provided at the lower end of the vessel 2. A drainage pipe 43 is connected to the blower 42 so that the foreign substance such as water generated in the blower is discharged outside of the blower 42.

A second liquid supplier 6 for supplying the liquid to the gas flowing through the pipe 41 is provided for the pipe 41 placed between the gas supply source 40 and the blower 42. The second liquid supplier 6 includes a pipe 61 connected to a liquid supply source 60, and a spray nozzle member 62 in the pipe 41 of the gas supplier 4 as illustrated in an enlarged diagram. The second liquid supplier 6 supplies the cleaning liquid in a spray form from the liquid supply source 60 to the gas flowing through the pipe 41 via the spray nozzle member 62. The pipe 61 includes a flow control valve 63 controlling the amount of the liquid to be supplied. The amount of the liquid supplied from the spray nozzle member 62 may be in a range of approximately 0.01 to 0.5 vol % based on the amount of the exhaust gas, and the cleaning liquid sprayed by the spray nozzle member 62 may have a droplet diameter of approximately 0.1 to 500 μm. Tap water may be used as the cleaning liquid. Alternatively, liquid having high wettability with foreign substances or liquid having low surface tension may also preferably used as the cleaning liquid. Examples of the liquid sprayed may include aqueous solutions such as NaOH, $MgOH_2$, HCl, $H_2SO_4$, and NaClO; however, alkaline aqueous solutions such as NaOH may preferably be sprayed if the exhaust gas contains an acid gas such as HCl, or $NO_x$.

The second liquid supplier 6 may also supply the vaporous cleaning liquid in an amount of approximately 0.01 to 0.5 vol % based on the amount of the exhaust gas.

According to the embodiment of the gas-liquid contact system, since the spray nozzle member 62 supplies the spraying cleaning liquid to the exhaust gas, which is yet to reach the blower 42, the gases contained in the exhaust gas such as the HCl, $NO_x$, $SO_x$, and $NH_3$ can be absorbed in the cleaning liquid.

Mist particulates each having a small diameter contained in the exhaust gas have increased diameters and water content due to collision with and adhesion to the cleaning liquid. The mist particulates that have increased diameters and are thus dissolved in fresh water are discharged outside with the cleaning liquid via a drainage pipe 43 attached to the blower 42 using rotary force of the blades in the blower 42. In this manner, adhesion or growth of dust particulates and droplets on an impeller may be inhibited in the blower 42 and the pipe 41, thereby providing the gas-liquid system 1 a longer life. Moreover, since the blower 42 can continuously operate in a longer time, spare blowers may not need preparing.

Figure 2A:
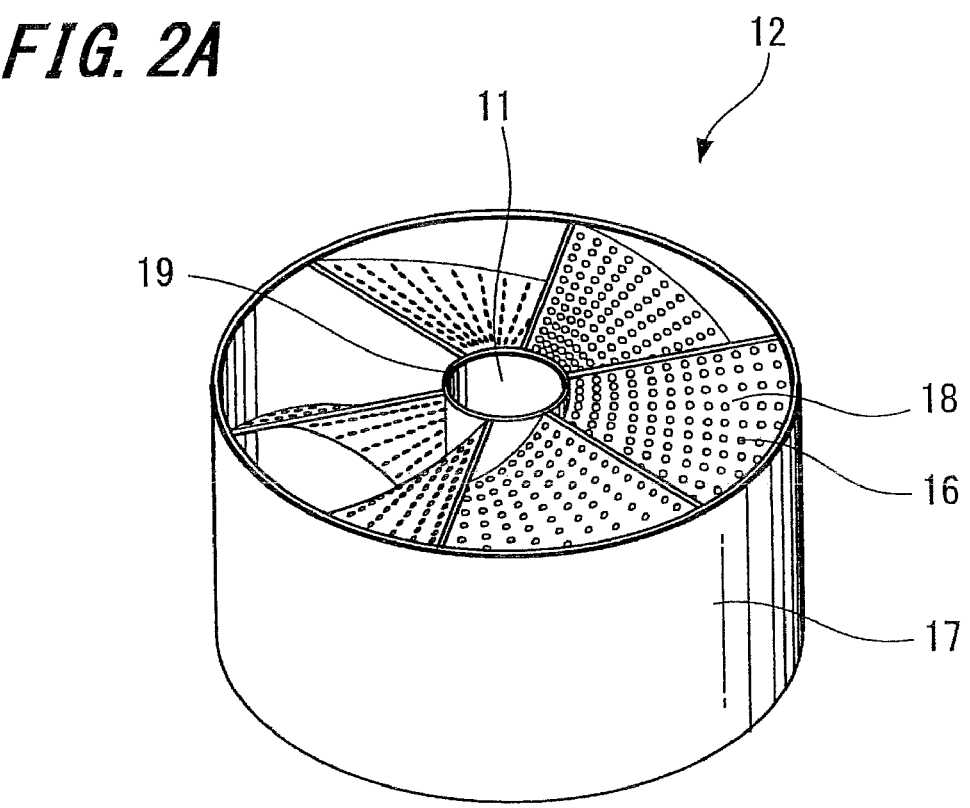
FIG. 2A is a perspective view of a mixing element.

Next, a mixing element constituting the static fluid mixer 3 according to an embodiment will be described in details with reference to drawings. FIG. 2A is a perspective view of a mixing element, and FIG. 2B is a top view of the mixing element according to the embodiment of the invention.

Figure 2B:
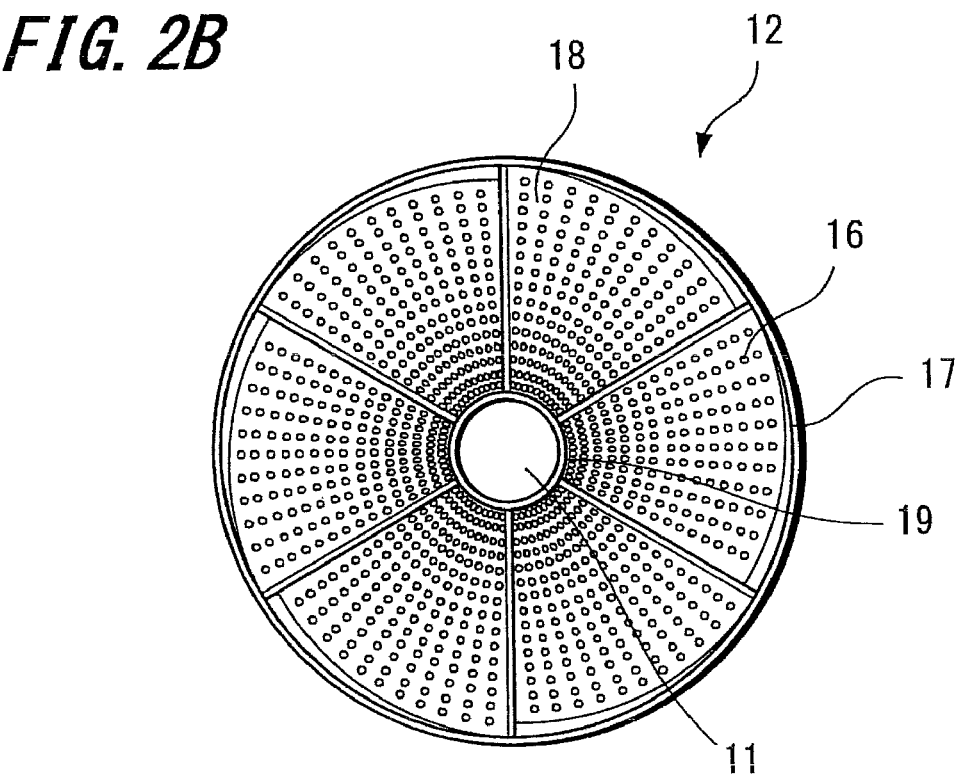
FIG. 2B is a top view of the mixing element according to the embodiment of the invention.

As shown in FIGS. 2A, 2B, the mixing element 12 of the static fluid mixer 3 utilized in this embodiment includes an external cylindrical tube 17 (passage tube), a blade (blade assembly) provided in the external tube 17, an internal tube 19 discontinuously provided from the external tube 17 for allowing the blade to be placed between the external tube 17 and internal tube 19. The blade 18 is formed of a porous plate having a plurality of pores. The internal tube 19 is provided so as to increase the mechanical strength against the torsional stress of the blades 18.

The length of the internal tube 19 is determined so as to allow the blade to be connected to the internal tube 19. The blade 18 is formed twisted clockwise (rightward) toward an inner surface of the external tube 17, and one end of the blade is connected to an outer surface of the internal tube 19, while the other end is connected to an inner surface of the external tube 17. The internal tube 19 has an opening 11 in the axial center thereof, so that the blades 18 are located off the axial center of the external tube 17. Similarly, a plurality of the blades 18 is right-twisted and connected to the outer surface of the internal tube 19 to form a fluid passage. Two or more mixing units 12 may be continuously arranged in a longitudinal direction of the fluid mixing units 12 to form the static fluid mixer 3. In addition, a spacer (not shown) is placed to form space between the two or more mixing units.

While two types of fluids, namely gas and liquid mutually flowing in the opposite directions, pass through the fluid passage of the static fluid mixer 3 configured as described above, part of the fluid spirally twisted along the blades 18 to form a rightward swirl flow, and another part of the fluid passes through the pores 16. Still another part of the fluid is sheared by the blades 18, is then merged with the fluid passed through the pores 16, and the resulting fluid is further divided. The two types of fluid mutually flowing in the opposite directions are thus in contact while being twisted, passed through, sheared, merged, divided, and reversed in the static fluid mixer 3.

The blade 18 is formed of the porous plate which allows the fluid to pass through the pores 16, and rectifies the upward and downward flow in the external tube 17. The resulting fluid is then in contact with the fluid moved along the swirl flow and hence the fluid is uniformly dispersed in the entire mixing elements 12. Accordingly, since the gas-liquid contact efficiency will increase and adhesion or growth of solid particulates may be inhibited, maintenance of the system may no longer be required. In the embodiment, the blade 18 of the static fluid mixer 3 is not limited to right-twisted; however, the blade 18 may be left-twisted.

If the proportion of the number of pores in the porous plate forming the blade 18 is in a range of 5 to 80%, the fabrication processes may be simplified, the production cost may be decreased, excellent mechanical strength of the blade and may be obtained, superior gas-liquid contact efficiency may be obtained, and accretion of the solid particulates may be inhibited. The proportion of the number of pores in the porous plate forming the blade 18 may preferably be in a range of 5 to 80%, accordingly. The proportion of the number of pores in the porous plate may more preferably be in a range of 10 to 40%.

If the diameter of a pore 16 of the porous plate forming the blade 18 is in a range of 5 to 30 mm, the fabrication processes may be simplified, the production cost may be decreased, superior gas-liquid contact efficiency may be obtained, and accretion of the solid particulates may be inhibited. The diameter of the pore 16 of the porous plate forming the blade 18 may preferably be in a range of 5 to 30 mm.

Next, the behavior of the gas-liquid contact system of the embodiment illustrated in FIG. 1 is described. First, the gas containing foreign substances to be separated (exhaust gas) is supplied from the gas supplier 4 and the liquid (cleaning liquid) used for separating the foreign substances from the first liquid supplier into the static fluid mixer 3 at respective predetermined proportion.

The exhaust gas generated from the supply source 40 of the gas is transferred to the blower 42 via the pipe 41. At this moment, the spray nozzle member 62 of the second liquid supplier 6 supplies the cleaning liquid in the spray form to the gas passing through the pipe 41, thereby allowing the exhaust gas to be in contact with the cleaning liquid.

The amount of the spraying cleaning liquid supplied from the second liquid supplier 6 to the blowing device 7 may be in a range of approximately 0.01 to 0.5 vol % based on the amount of the exhaust gas supplied from the gas supplier 4. The surface tension of the cleaning liquid supplied from the second liquid supplier 6 may approximately be $73*10^{-3}$ N/m or less at 20° C. The cleaning liquid contains a surfactant, the content of which may be in a range of approximately 0.001 to 5.0 wt %.

The cleaning liquid supplied from the second liquid supplier 6 may be vaporous cleaning liquid, the amount of which to be supplied may be in a range of approximately 0.01 to 0.5 vol % based on the amount of the exhaust gas supplied from the gas supplier 4 into the vessel 2.

Specifically, the dust and mist particulates contained in the exhaust gas can be trapped with the cleaning liquid supplied from the spray nozzle member 62. Similarly, specific gases such as a hydrogen chloride gas contained in the exhaust gas can be absorbed in the cleaning liquid. Since the gas absorbed and dust particulates trapped in the cleaning liquid are discharged outside from the drainage pipe 43 connected to the blower 42 using the rotary force of the blades in the blower 42, the amount of dust particulates adhered to the impeller of the blower 42 or to the inner surface of the pipe 41 decrease.

Subsequently, the exhaust gas supplied from the blower 42 into the vessel 2 via the inlet pipe drifts upward in the static fluid mixer 3. The flow rate of the exhaust gas passing through the reservoir 21c when introduced in the vessel 2 may be in a range of approximately 5 to 25 m/sec, and may particularly preferably be in a range of approximately 10 to 20 m/sec according to a particle size of the mist particulate contained in the exhaust gas. The flow rate of the exhaust gas passing through the gas-liquid contact unit 21b when introduced in the static fluid mixer 3 may be in a range of approximately 2 to 15 m/sec, and may particularly preferably be in a range of approximately 3 to 12 m/sec. The flow rate of the exhaust gas passing through the separation-drip unit 21a when discharged from the static fluid mixer 3 may be in a range of approximately 1 to 8 m/sec. It is preferable that the larger the particle size of the mist particulate be, the higher the flow rate of the exhaust gas may be.

In this embodiment, the nozzle of the upper spray nozzle member 52a is (downwardly) arranged in the direction towards the static fluid mixer 3, while the nozzle of the lower spray nozzle member 52b is (upwardly) arranged in the direction towards the static fluid mixer 3. The cleaning liquid supplied from the nozzle member 52a of the first liquid supplier 5 drifts downward while the cleaning liquid supplied from the spray nozzle member 52b of the first liquid supplier 5 drifts upward in the static fluid mixer 3. Thus, the exhaust gas and cleaning liquid are mutually in contact with stirring, and hence the gas and liquid are sufficiently in contact.

Specifically, droplets (mist) contained in the sprayed cleaning liquid having a droplet diameter of approximately 100 to 3000 μm from the spray nozzle member 52b concurrently flow from the lower to upper parts of the mixing element 12 to pass therethrough. In this gas-liquid contact treatment with stirring, since the mist particulates each having a small particle size tend to have an increased particle size, the particulate is trapped with the cleaning liquid sprayed from the spray nozzle members 52, thereby dripping towards the lower part of the vessel 2. The dripped mist particulates are discharged outside via the drainage pipe 22 provided in the inner surface of the vessel 2.

Specifically, in the static fluid mixer 3, the gas is cleaned and purified by the gas-liquid contact treatment where the foreign substances are separated from the exhaust gas, the fine droplets are dissolved into the liquid, or the chemical reaction is accelerated.

The amount of the cleaning liquid supplied from the first liquid supplier 5 to the vessel 2 may be in a range of approximately 0.1 to 20 L/m³ with the liquid-to-gas ratio, based on the amount of the exhaust gas supplied from the gas supplier 4 to the vessel 2. The surface tension of the cleaning liquid supplied from the first liquid supplier 5 may approximately be $73*10^{-3}$ N/m or less at 20° C. The cleaning liquid contains a surfactant, the content of which may be in a range of approximately 0.001 to 5.0 wt %. Any types of surfactants may be employed in this embodiment; however, it is preferable to use surfactants that has low foamability and will not remain in the natural environment.

It is also preferable that a water-seal be provided around an interface between the vessel 2 and the drainage pipe 22 so as to prevent the outflow of the exhaust gas.

The gas-liquid contact system of the embodiment may continuously process and separate foreign substances or fine solid particulates, such as silicon dioxides, aluminum oxides, and zinc oxides, from the exhaust gas. The exhaust gas containing fine solid particulates are, for example, supplied from the lower end of the static fluid mixer 3, and the cleaning liquid is subsequently supplied from either the upper end or lower end of the static fluid mixer 3 via the spray nozzle member 52. The exhaust gas is caused to drift upward at a predetermined flow rate in the static fluid mixer 3 while the cleaning liquid causing to pass through in the static fluid mixer 3, thereby continuously contacting the solid particulates in the exhaust gas and the cleaning liquid to separate the solid particulates from the exhaust gas. The cleaned gas is then discharged or collected via the exhaust pipe 8 as a treated gas. The cleaning liquid containing the solid particulates are discharged or collected outside of the system via the drainage pipe 22.

According to the gas-liquid contact system of the embodiment, since the second liquid supplier supplies liquid such as cleaning liquid to the gas such as an exhaust gas before the gas reaches the blowing device, thereby eliminating the foreign substances from the gas successfully. Consequently, the amount of the foreign substances attached to the blowing device or pipes can decrease, and hence the system can continuously be running in a long time without replacing the blowing device or pipe.

According to the gas-liquid contact system of the embodiment, since the second liquid supplier supplies the liquid to the static fluid mixer 3 and cools the liquid, the temperature of the gas can be lowered before the gas reaches the blowing device. Accordingly, the blowing device such as a blower can be formed of a resin material having low heat resistance such as FRP or PVC. Since the resin material such as FRP or PVC exhibits excellent corrosion resistance, even though the gas used in the embodiment is a corrosive gas such as a hydrochloric acid gas, the system can continuously be running in a long time without replacing the blower.

According to the gas-liquid contact system of the embodiment, since the second liquid supplier supplies an alkaline aqueous solution such as NaOH to the static fluid mixer 3, the gas such as a hydrochloric acid gas can be neutralized before the gas reaches the blowing device. This neutralization can decrease the corrosiveness of the gas. Thus, the blowing device such as a blower can be formed of a metallic material having low corrosion resistance such as iron. The blowing device formed of the metallic material usually exhibits an increased mechanical strength, which implies that the rotational rate of the blades utilized for the blower can be increased. Accordingly, the torque load of the motor rotating the blade can be reduced, thereby also lowering the electrical power consumption therefore. In addition, the increased mechanical strength of the blowing device may enable to reduce the size of the system.

Since a mixing element of the gas-liquid contact system according to the embodiment includes a spiral blade and an opening in the center thereof, the gas introduced in the mixing element can be divided into the following two types of the gas: namely, a gas having a delayed wave generated around the blade, and a gas having a straight wave generated at the opening. Thus, the gas introduced can be divided into the different sound waves having different wavelengths. These gases having different sound waves can mutually be interfered to thereby obtain silencing effect. The sound waves can be caused to contact with the cleaning liquid so that the liquid can absorb the sound waves, thereby also obtaining silencing effect. Thus, noises such as an exhausting noise generated from the blower can be reduced in the system of the embodiment.

According to the gas-liquid contact system of the embodiment, since the system is constantly cleaned with the cleaning liquid, the growth of the solid particulates or scaling may not be observed. Thus, neither the maintenance of the system nor the cost required or the maintenance may be necessary.

Next, the outcome of experiments conducted on the gas-liquid contact system according to the embodiment will be illustrated.

Experiment 1

The absorption and dust collecting efficiencies of the gas-liquid contact system according to the embodiment were evaluated as described below. Table 1 shows the outcome of physical absorption of HCl gas and $SiO_2$ dust collection (dust removal) measured with the gas-liquid contact system of the embodiment.

In measuring the absorption of the gas and dust collection, the amount of the treated gas ($m^3$/min) supplied to the vessel 2, the flow rate of the gas (m/s), and the amount of the cleaning liquid ($m^3$/hr) supplied to the system were varied; and the concentration of HCl (ppm) gas and the density of $SiO_2$ dust (mg/$Nm^3$) were measured at both the inlet of the blower 42 and the outlet of the exhaust pipe in the gas-liquid.

The first embodiment of the gas-liquid contact system included a static fluid 3 including three mixing elements 12 arranged in tandem. The mixing elements 12 each included a cylinder with the internal diameter of 298 mm, and the height of 180 mm. Each cylinder includes 12 blades 18 each twisted by approximately 90 degrees. The blade was formed of a porous plate, and each pore 16 was 10 mm in diameter. The total porous area of the blade was approximately 10% of the surface area of the blade.

The amount of the cleaning liquid supplied from the second liquid supplier to the pipe 41 was approximately 0.02 vol % of the treated exhaust gas introduced from the inlet of the blower while the amount of the cleaning liquid supplied from the first liquid supplier to the vessel 2 was approximately 0.5 vol % of the exhaust gas introduced to the vessel 2. The proportion of the cleaning liquid supplied from the first liquid supplier was in a range of approximately 5 to 30% based on the total amount of the cleaning liquid when supplied from the upper spray nozzle member 52a; while the proportion was in a range of approximately 95 to 70% when supplied from the lower spray nozzle member 52b. The proportion of the cleaning liquid supplied from the upper spray nozzle member 52a and that supplied from the lower spray nozzle member 52b was optionally determined based on compositions of gas treated and concentration of the gas, types of dust, density of the dust, a particle size, and the like.

Thus, the experiment 1 was carried out under the following three conditions.

TABLE 1

THREE CONDITIONS FOR EXPERIMENT 1

| | Conditions | | |
|---|---|---|---|
| | 1 | 2 | 3 |
| Amount of exhaust gas treated ($m^3$/min) | 50 | 30 | 10 |
| Flow rate of inflow exhaust gas (m/s) | 12 | 7.2 | 2.4 |
| Amount of cleaning liquid supplied from first liquid supply device ($m^3$/hr) | 15 | 9 | 3 |
| Amount of cleaning liquid supplied from second liquid supply device (l/hr) | 600 | 360 | 120 |
| HCl concentration at inlet (ppm) | 100 | 100 | 100 |
| HCl concentration at outlet (ppm) | 98 | 95 | 92 |
| Dust density at inlet (ppm) | 200 | 200 | 200 |
| Dust density at outlet (ppm) | 20 | 25 | 30 |

Table 1 shows that the values of HCl gas concentration and $SiO_2$ dust density were lower at the outlet of the exhaust pipe 8 than at the inlet of the blower 42 of the gas-liquid contact system 1, in any of the three conditions. In other words, the gas absorption efficiency and dust collecting efficiency were improved by utilizing the gas-liquid contact system 1 of the embodiment.

Experiment 2

The absorption and dust collecting efficiencies of the gas-liquid contact system according to the embodiment were evaluated as described below. Table 2 shows the outcome of physical absorption of HCl gas and $SiO_2$ dust collection (dust removal) measured with the gas-liquid contact system of the embodiment.

In measuring the absorption of the gas and dust collection, the amount of the treated gas ($m^3$/min) supplied to the vessel 2, the flow rate of the gas (m/s), and the amount of the cleaning liquid ($m^3$/hr) supplied to the system were varied; and the concentration of HCl (ppm) gas and the density of $SiO_2$ dust (mg/$Nm^3$) were measured at both the inlet of the blower 42 and the outlet of the exhaust pipe in the gas-liquid.

The first embodiment of the gas-liquid contact system includes a static fluid 3 including five mixing elements 12 arranged in tandem. The mixing elements 12 each included a cylinder with the internal diameter of 298 mm, and the height of 180 mm. Each cylinder includes 12 blades 18 each twisted by approximately 45 degrees. The blade was formed of a porous plate, and each pore 16 was 20 mm in diameter. The total porous area of the blade was approximately 20% of the surface area of the blade.

The amount of the cleaning liquid supplied from the second liquid supplier to the pipe 41 was approximately 0.02 vol % of the treated exhaust gas introduced from the inlet of the blower while the amount of the cleaning liquid supplied from the first liquid supplier to the vessel 2 was approximately 0.5 vol % of the exhaust gas introduced to the vessel 2. The proportion of the cleaning liquid supplied from the first liquid supplier was in a range of approximately 5 to 30% based on the total amount of the cleaning liquid when supplied from the upper spray nozzle member 52a; while the proportion was in a range of approximately 95 to 70% when supplied from the lower spray nozzle member 52b. The proportion of the cleaning liquid supplied from the upper spray nozzle member 52a and that supplied from the lower spray nozzle member 52b was optionally determined based on compositions of gas, types of dust, concentration, a particle size, and the like.

Thus, the experiment 2 was carried out under the following three conditions.

TABLE 2

THREE CONDITIONS FOR EXPERIMENT 2

|  | Conditions | | |
|---|---|---|---|
|  | 1 | 2 | 3 |
| Amount of exhaust gas treated ($m^3$/min) | 50 | 30 | 10 |
| Flow rate of inflow exhaust gas (m/s) | 12 | 7.2 | 2.4 |
| Amount of cleaning liquid supplied from first liquid supply device ($m^3$/hr) | 15 | 9 | 3 |
| Amount of cleaning liquid supplied from second liquid supply device (l/hr) | 600 | 360 | 120 |
| HCl concentration at inlet (ppm) | 100 | 100 | 100 |
| HCl concentration at outlet (ppm) | 99 | 98 | 95 |
| Dust density at inlet (ppm) | 200 | 200 | 200 |
| Dust density at outlet (ppm) | 15 | 20 | 25 |

Table 2 shows that the values of HCl gas concentration and $SiO_2$ dust density were lower at the outlet of the exhaust pipe than at the inlet of the blower 42, in any of the three conditions. In other words, the gas absorption efficiency and dust collecting efficiency were improved by utilizing the gas-liquid contact system 1 of the embodiment.

Experiment 3

The droplet or mist collecting efficiency of the gas-liquid contact system according to the embodiment was evaluated as described below. Table 3 shows the outcome of mist collection measured with the gas-liquid contact system of the embodiment.

In measuring the absorption of the gas and dust collection, the amount of the treated gas ($m^3$/min) supplied to the vessel 2, the flow rate of the gas (m/s), and the amount of the cleaning liquid ($m^3$/hr) supplied to the system were varied; and the concentration of the mist (mg/$Nm^3$) was measured at both the inlet of the blower 42 and outlet of the exhaust pipe in the gas-liquid.

The first embodiment of the gas-liquid contact system includes a static fluid 3 including two mixing elements 12 arranged in tandem. The mixing elements 12 each included a cylinder with the internal diameter of 310 mm, and the height of 380 mm. Each cylinder included 12 blades 18 each twisted by approximately 180 degrees. The blade was formed of a porous plate, and each pore 16 was 20 mm in diameter. The total porous area of the blade was approximately 40% of the surface area of the blade.

The amount of the cleaning liquid supplied from the second liquid supplier to the pipe 41 was approximately 0.05 vol % of the treated exhaust gas introduced from the inlet of the blower while the amount of the cleaning liquid supplied from the first liquid supplier to the vessel 2 was approximately 0.2 vol % of the exhaust gas introduced to the vessel 2. The proportion of the cleaning liquid supplied from the first liquid supplier was in a range of approximately 10 to 40% based on the total amount of the cleaning liquid when supplied from the upper spray nozzle member 52a; while the proportion was in a range of approximately 90 to 60% when supplied from the lower spray nozzle member 52b. The proportion of the cleaning liquid supplied from the upper spray nozzle member 52a and that supplied from the lower spray nozzle member 52b was optionally determined based on compositions of gas, types of dust, concentration, a particle size, and the like.

Thus, the experiment 3 was carried out under the following three conditions.

TABLE 3

THREE CONDITIONS FOR EXPERIMENT 3

|  | Conditions | | |
|---|---|---|---|
|  | 1 | 2 | 3 |
| Amount of exhaust gas treated ($m^3$/min) | 50 | 25 | 10 |
| Flow rate of inflow exhaust gas (m/s) | 11 | 5.5 | 2.2 |
| Amount of cleaning liquid supplied from first liquid supply device ($m^3$/hr) | 6 | 3 | 1.2 |
| Amount of cleaning liquid supplied from second liquid supply device (l/hr) | 1500 | 750 | 300 |
| Mist concentration at inlet (ppm) | 10000 | 10000 | 10000 |
| Mist concentration at outlet (ppm) | 100 | 30 | 10 |

Table 3 shows that the value of mist concentration obtained was lower that at the outlet of the exhaust pipe than at the inlet of the blower 42, in any of the three conditions. In other words, the mist collecting efficiency was improved by utilizing the gas-liquid contact system 1 of the embodiment.

Experiment 4

The droplet or mist collecting efficiency of the gas-liquid contact system according to the embodiment was evaluated as described below. Table 4 shows the outcome of mist collection measured with the gas-liquid contact system of the embodiment.

In measuring the mist collection, the amount of the treated gas ($m^3$/min) supplied to the vessel 2, the flow rate of the gas (m/s), and the amount of the cleaning liquid ($m^3$/hr) supplied to the system were varied; and the concentration of the mist (mg/$Nm^3$) was measured at both the inlet of the blower 42 and outlet of the exhaust pipe in the gas-liquid.

The first embodiment of the gas-liquid contact system included a static fluid 3 including four mixing elements 12 arranged in tandem. The mixing elements 12 each included a cylinder with the internal diameter of 310 mm, and the height of 90 mm. Each cylinder included 24 blades 18 each twisted by approximately 45 degrees. The blade is formed of a porous plate, and a diameter of each pore 16 is 10 mm. The total porous area of the blade is approximately 20% of the surface area of the blade.

The amount of the cleaning liquid supplied from the second liquid supplier to the pipe 41 was approximately 0.05 vol % of the treated exhaust gas introduced from the inlet of the blower while the amount of the cleaning liquid supplied from the first liquid supplier to the vessel 2 was approximately 0.2 vol % of the exhaust gas introduced to the vessel 2. The proportion of the cleaning liquid supplied from the first liquid supplier was in a range of approximately 10 to 40% based on the total amount of the cleaning liquid when supplied from the upper spray nozzle member 52a; while the proportion was in a range of approximately 90 to 60% when supplied from the lower spray nozzle member 52b. The proportion of the cleaning liquid supplied from the upper spray nozzle member 52a and that supplied from the lower spray nozzle member 52b was optionally determined based on compositions of gas, types of dust, concentration, a particle size, and the like.

Thus, the experiment 4 was carried out under the following three conditions.

TABLE 4

THREE CONDITIONS FOR EXPERIMENT 4

| | Conditions | | |
|---|---|---|---|
| | 1 | 2 | 3 |
| Amount of exhaust gas treated (m³/min) | 50 | 25 | 10 |
| Flow rate of inflow exhaust gas (m/s) | 11 | 5.5 | 2.2 |
| Amount of cleaning liquid supplied from first liquid supply device (m³/hr) | 6 | 3 | 1.2 |
| Amount of cleaning liquid supplied from second liquid supply device (l/hr) | 1500 | 750 | 300 |
| Mist concentration at inlet (ppm) | 10000 | 10000 | 10000 |
| Mist concentration at outlet (ppm) | 50 | 15 | 5 |

Table 4 shows that the value of mist concentration obtained was lower that at the outlet of the exhaust pipe than at the inlet of the blower 42, in any of the three conditions. In other words, the mist collecting efficiency was improved by utilizing the gas-liquid contact system 1 of the embodiment.

Experiment 5

The droplet or mist collecting efficiency of the gas-liquid contact system according to the embodiment was evaluated as described below. Table 5 shows the outcome of mist collection measured with the gas-liquid contact system of the embodiment.

In measuring the mist collection, the amount of the treated gas (m³/min) supplied to the vessel 2, the flow rate of the gas (m/s), and the amount of the cleaning liquid (m³/hr) supplied to the system were varied; and the concentration of the mist (mg/Nm³) was measured at both the inlet of the blower 42 and outlet of the exhaust pipe in the gas-liquid.

Figure 8A:
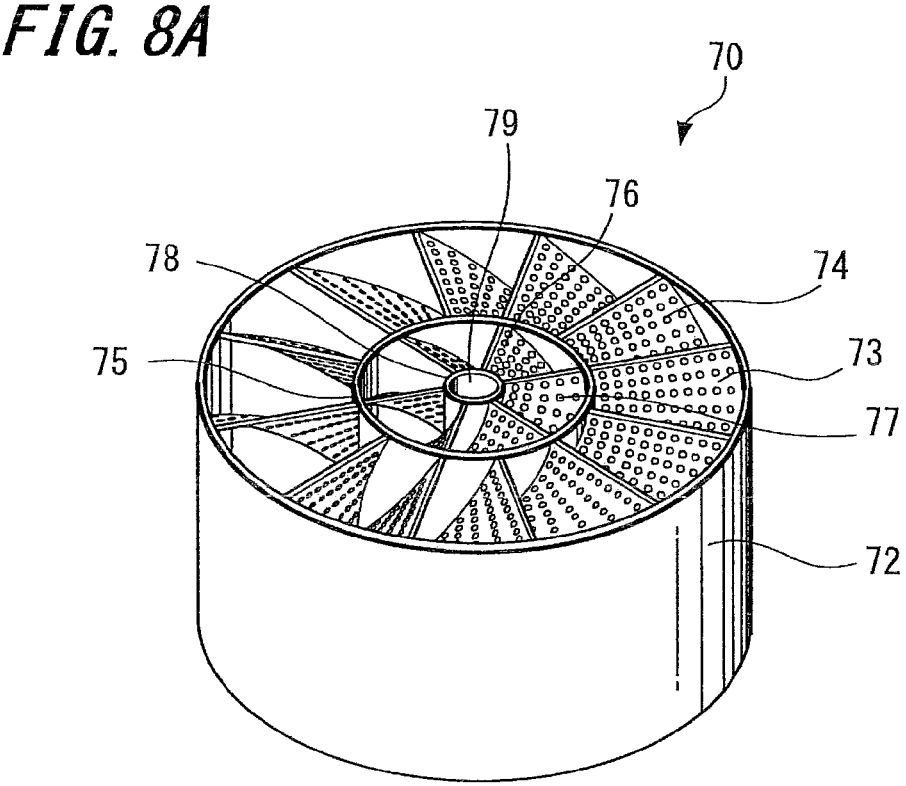
FIG. 8A is a perspective view of a mixing element.
Figure 8B:
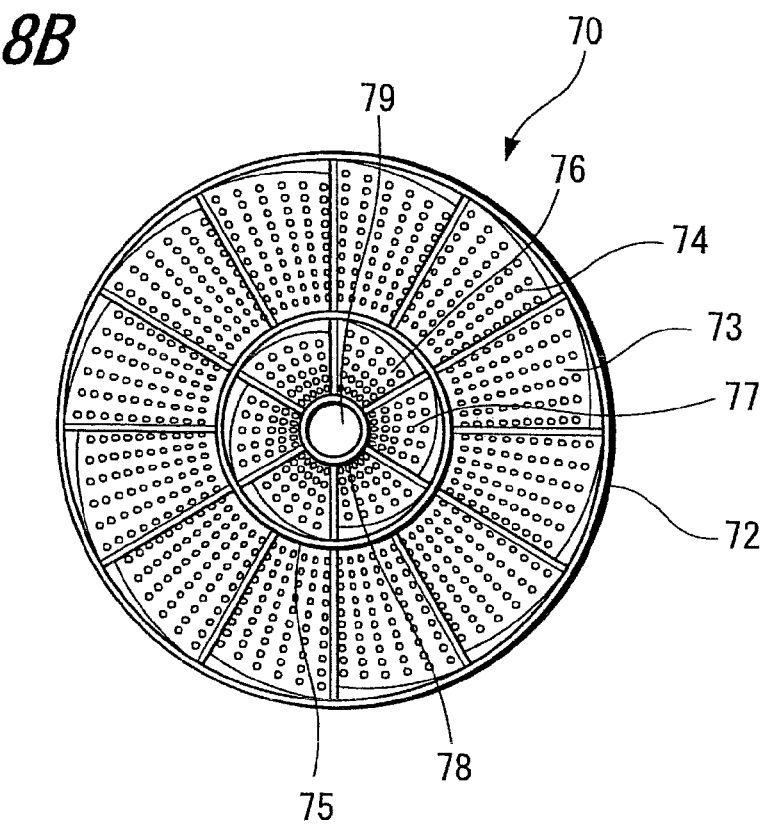
FIG. 8B is a top view of the mixing element according to the embodiment of the invention.

The first embodiment of the gas-liquid contact system included a static fluid 3 including four mixing elements 12 arranged in tandem. According to the embodiment, as shown in FIGS. 8A, 8B, each mixing element 12 included a first and second blade assemblies. The internal diameter of a cylinder having the first blade assembly was 310 mm, that of a cylinder having the second blade assembly was 90 mm, and each height thereof was 90 mm. The first blade assembly included 12 blades 18 each twisted approximately 45 degrees, while the second blade assembly included six blades 18 each twisted approximately 45 degrees. The blade was formed of a porous plate, and each pore 16 was 20 mm in diameter. The total porous area of the blade was approximately 40% of the surface area of the blade.

The amount of the cleaning liquid supplied from the second liquid supplier to the pipe 41 was approximately 0.05 vol % of the treated exhaust gas introduced from the inlet of the blower while the amount of the cleaning liquid supplied from the first liquid supplier to the vessel 2 was approximately 0.2 vol % of the exhaust gas introduced to the vessel 2. The proportion of the cleaning liquid supplied from the first liquid supplier was in a range of approximately 10 to 40% based on the total amount of the cleaning liquid when supplied from the upper spray nozzle member 52a; while the proportion was in a range of approximately 90 to 60% when supplied from the lower spray nozzle member 52b. The proportion of the cleaning liquid supplied from the upper spray nozzle member 52a and that supplied from the lower spray nozzle member 52b was optionally determined based on compositions of gas, types of dust, concentration, a particle size, and the like.

Thus, the experiment 5 was carried out under the following three conditions.

TABLE 5

THREE CONDITIONS FOR EXPERIMENT 5

| | Conditions | | |
|---|---|---|---|
| | 1 | 2 | 3 |
| Amount of exhaust gas treated (m³/min) | 50 | 25 | 10 |
| Flow rate of inflow exhaust gas (m/s) | 11 | 5.5 | 2.2 |
| Amount of cleaning liquid supplied from first liquid supply device (m³/hr) | 6 | 3 | 1.2 |
| Amount of cleaning liquid supplied from second liquid supply device (l/hr) | 1500 | 750 | 300 |
| Mist concentration at inlet (ppm) | 10000 | 10000 | 10000 |
| Mist concentration at outlet (ppm) | 50 | 15 | 5 |

Table 5 shows that the value of mist concentration obtained was lower that at the outlet of the exhaust pipe than at the inlet of the blower 42, in any of the three conditions. In other words, the mist collecting efficiency was improved by utilizing the gas-liquid contact system 1 of the embodiment.

Second Embodiment

A second embodiment of the invention is described as follow.

Figure 3:
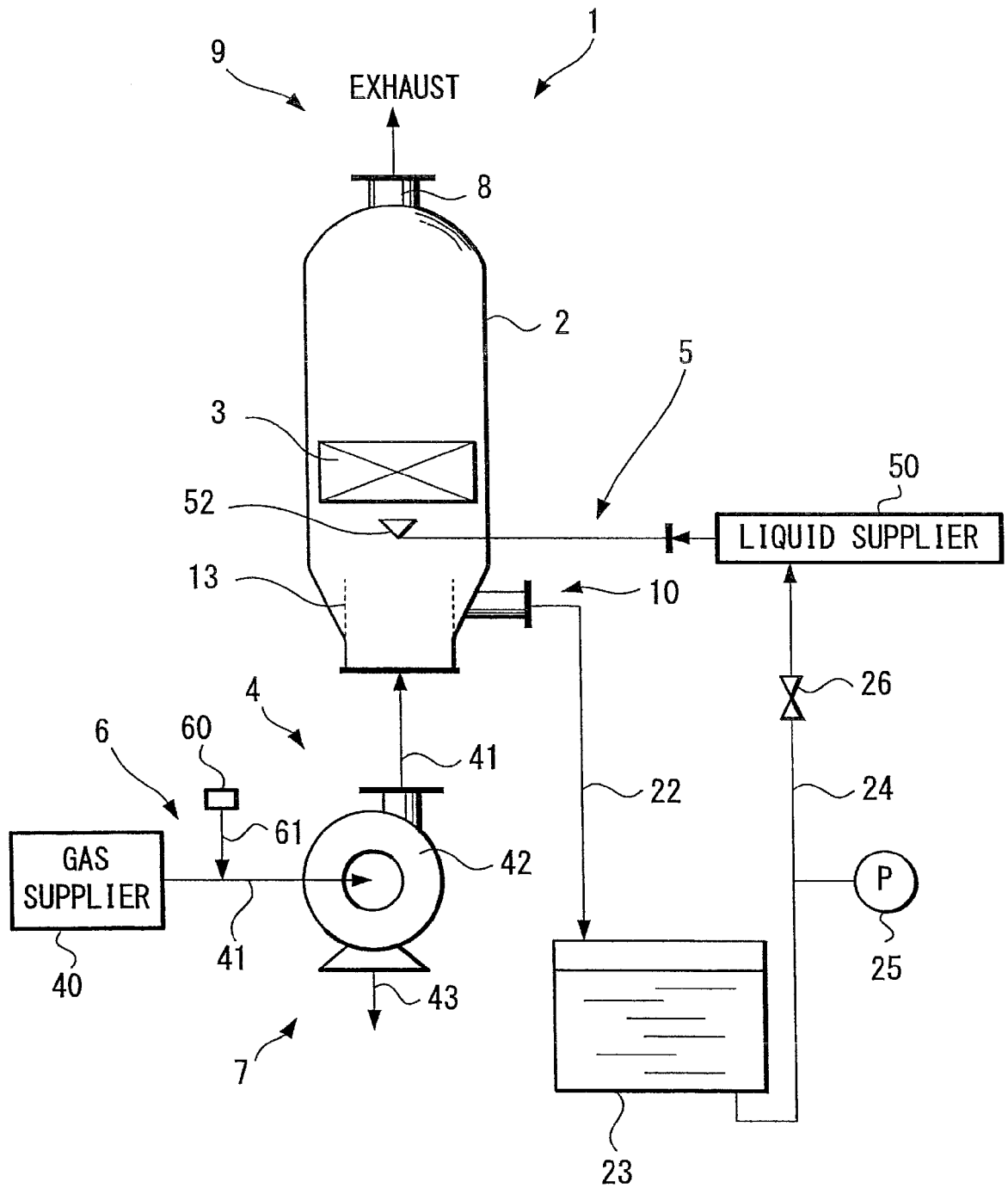
FIG. 3 is a schematic diagram illustrating a gas-liquid contact system according to another embodiment of the invention.

FIG. 3 is a schematic diagram illustrating a gas-liquid contact system 1 according to the second embodiment of the invention.

In FIG. 3, parts corresponding to those of FIG. 1 are indicated by the same symbols, and description thereof is omitted.

As shown in FIG. 3, the gas-liquid contact system of the second embodiment has the same elements as those of the first embodiment except for having a solid-liquid separator 23 via the drainage pipe 22, and a pipe 24 connecting the solid-liquid separator 23 with the liquid supply source of the first liquid supplier 50. The pipe 24 includes a pump 25, and a flow control valve 26 controlling the amount of the fluid flowing in the pipe 24. Notice that a neutralizing device may be provided to the gas-liquid system in place of the solid-liquid separator.

The liquid discharged from the reservoir 21c in the vessel 2 is sent to the solid-liquid separator 23 via the drainage pipe 22. Impurities are separated from the liquid sent to the solid-liquid separator 23 by natural precipitation such as a thickener. Thereafter, clear supernatant liquid from which the impurities are removed are supplied to the liquid supply source 50 by the pump 25 via the pipe 24. The circulating liquid supplied from the liquid supply source is supplied to the static fluid mixer 3 again via the spray nozzle member 52 provided in the vessel 2. Notice that forced filtration such as a centrifugal separator may be employed for circulating to utilize the filtrated liquid instead of natural precipitation. The liquid discharged from the blower 42 may be supplied to the solid-liquid separator 23 to treat the discharged liquid via the drainage pipe 43.

According to the gas-liquid contact system of the embodiment, since a closed system is formed in the system to circulate and supply the liquid to the static fluid mixer 30 via the pipes 22, 24, the liquid in the vessel 2 can be reused, thereby achieving the cost reduction in the drainage treatment.

Third Embodiment

Subsequently, a third embodiment is described as follow.

Figure 4:
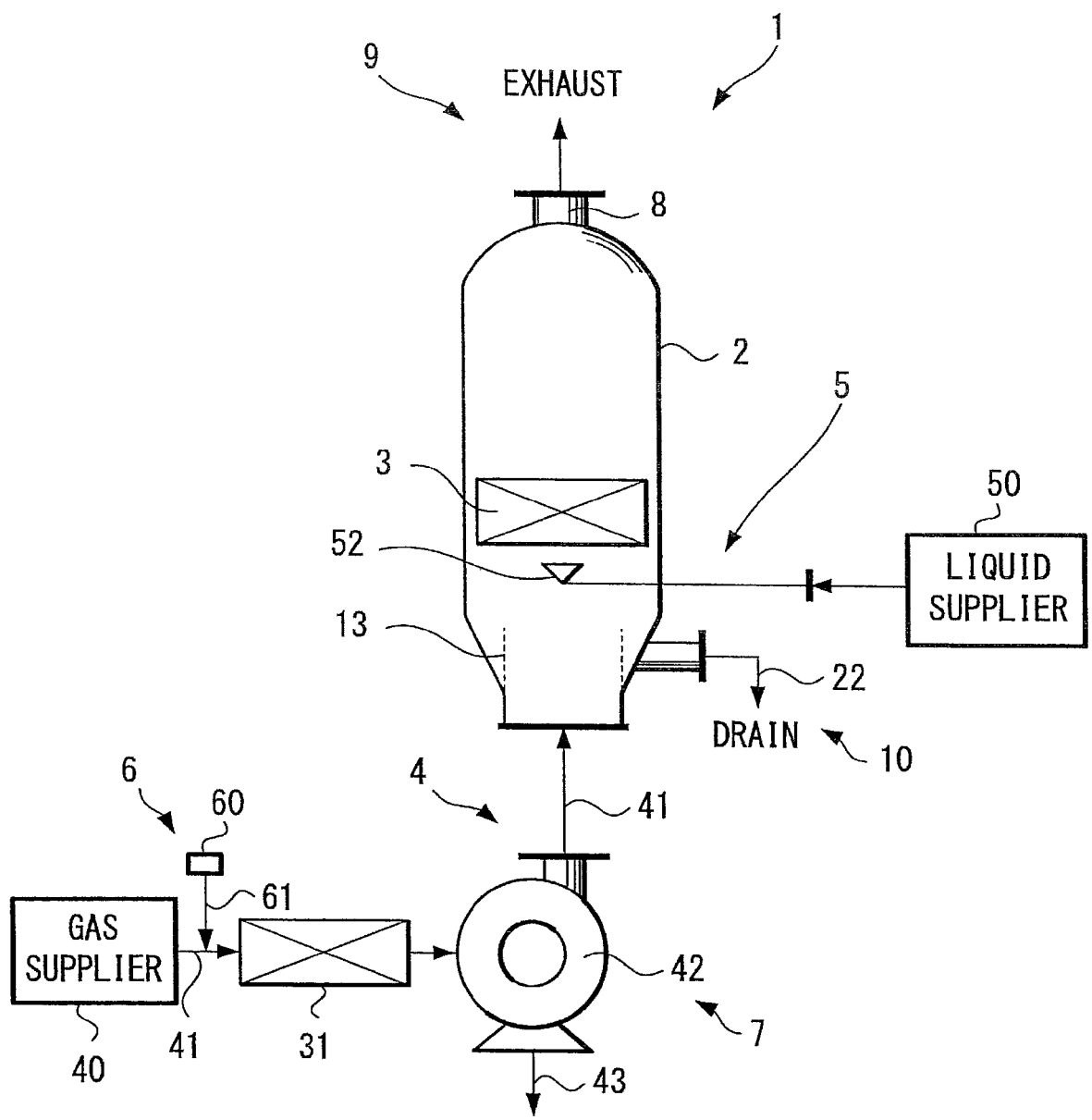
FIG. 4 is a schematic diagram illustrating a gas-liquid contact system according to still another embodiment of the invention.

FIG. 4 is a schematic diagram illustrating a gas-liquid contact system 1 according to the third embodiment of the invention. In FIG. 4, parts corresponding to those of FIG. 1 are indicated by the same symbols, and description thereof is omitted.

As shown in FIG. 4, the gas-liquid contact system of the second embodiment has the same elements as those of the first embodiment except for having a second static fluid mixer 31 placed at the downstream side of the second liquid supplier 6. The second static fluid mixers 31 are configured as the static fluid mixer 30, and may be placed either in horizontal direction or vertical direction in the gas-liquid contact system.

The exhaust gas supplied from the exhaust gas source 40 is sent to the second static fluid mixer 31 via the pipe 41. While the gas and the liquid supplied from the second liquid supplier 6 are mutually flowing through the passage of the second static fluid mixer 31, part of the fluid spirally twisted along the blades 18 of the mixing element 12 in the second static fluid mixer 31 to form a rightward swirl flow, and another part of the fluid passes through the pores 16 of the blades 18. Still another part of the fluid is sheared by the blades 18, is then merged with the fluid passed through the pores 16, and the resulting fluid is further divided. The gas-liquid contact efficiency can be improved while the fluid being twisted, passed through, sheared, merged, divided, and reversed in the second static fluid mixer 31.

Since the gas-liquid contact system according to the embodiment includes the second static fluid mixer 31, the foreign substances in the gas such as the exhaust gas can be eliminated before the exhaust gas reaches the blower 42. Consequently, the amount of the foreign substances attached to the blowing device or pipes can decrease, and hence the system can continuously be running in a long time without replacing the blow devices or pipes.

Fourth Embodiment

Subsequently, a fourth embodiment is described as follow.

Figure 5:
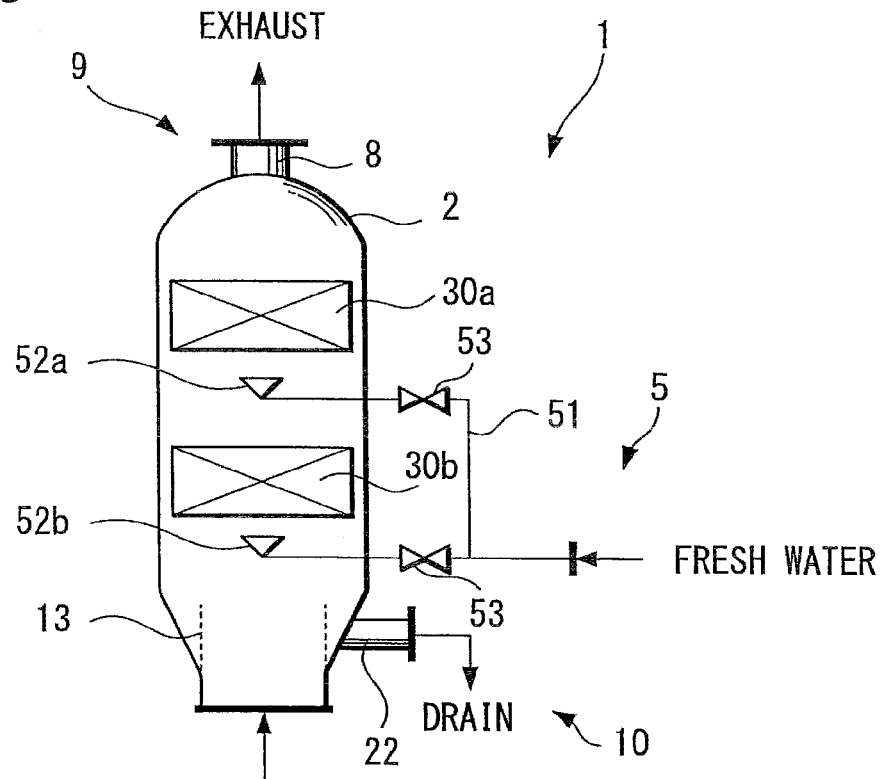
FIG. 5 is a schematic diagram illustrating a gas-liquid contact system according to still another embodiment of the invention.

FIG. 5 is a schematic diagram illustrating a gas-liquid contact system 1 according to the fourth embodiment of the invention.

In FIG. 5, parts corresponding to those of FIG. 1 are indicated by the same symbols, and description thereof is omitted.

As shown in FIG. 5, the gas-liquid contact system of the fourth embodiment has the same elements as those of the first embodiment except for having two static fluid mixers 30a, 30b in the vessel 2. The spray nozzle members 52a, 52b are respectively provided below the static fluid mixers 30a, 30b such that the nozzles of the spray nozzle members 52a, 52b are (upwardly) arranged in the direction towards the static fluid mixers 30a, 30b, respectively. The spray nozzle members 52a, 52b supply the cleaning liquid from the lower part of the static fluid mixers 30a, 30b. The exhaust gas introduced into the vessel 2 is passed through the static fluid mixers 30a, 30b twice before being discharged outside of the vessel 2. In this instance, the exhaust gas and cleaning liquid concurrently flow in the static fluid mixers 30a, 30b.

According to the gas-liquid contact system of the embodiment, since the exhaust gas supplied to the vessel 2 pass through the static fluid mixers 30a, 30b twice, the foreign substances in the exhaust gas can be eliminated with high probability.

Fifth Embodiment

Subsequently, a fifth embodiment is described as follow.

Figure 6:
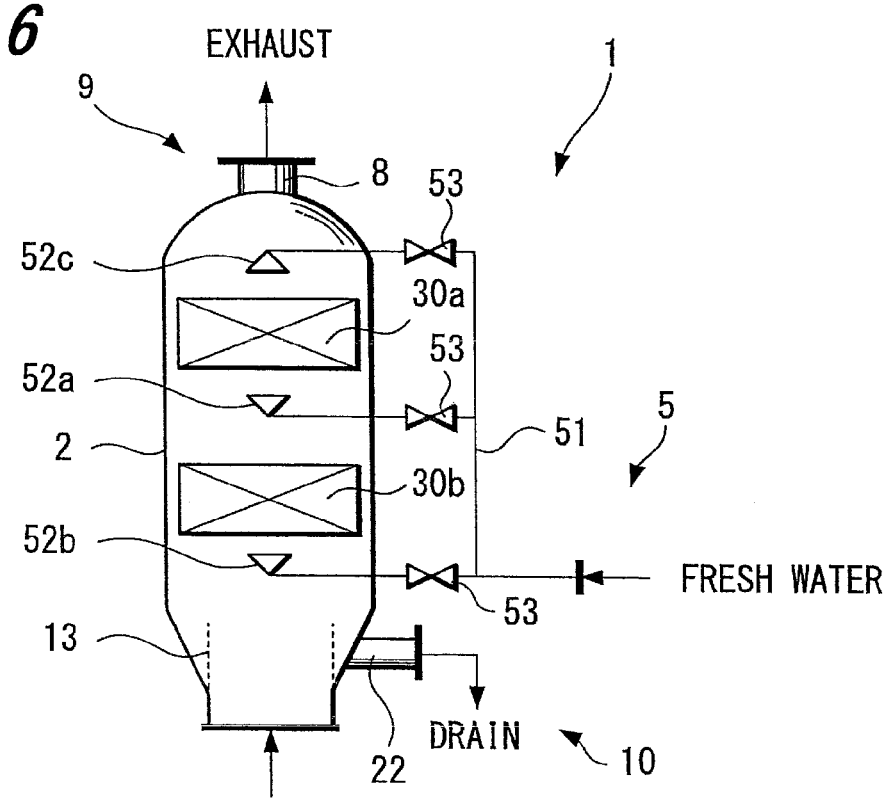
FIG. 6 is a schematic diagram illustrating a gas-liquid contact system according to still another embodiment of the invention.

FIG. 6 is a schematic diagram illustrating a gas-liquid contact system 1 according to the fifth embodiment of the invention. In FIG. 6, parts corresponding to those of FIG. 5 are indicated by the same symbols, and description thereof is omitted.

As shown in FIG. 6, the gas-liquid contact system of the fifth embodiment has the same elements as those of the fourth embodiment except for having a spray nozzle member 52c diverged from the pipe 51 that is located above the second static fluid mixer 30a, and the nozzle of the spray nozzle member 52 is downwardly arranged to face the static fluid mixer 30a. The spray nozzle member 52c supplies the cleaning liquid from the upper part of the static fluid mixers 30a. Accordingly, the exhaust gas and cleaning liquid are mutually in contact in both concurrent and countercurrent directions in the static fluid mixers 30a, 30b.

According to the gas-liquid contact system of the embodiment, since the cleaning liquid is sprayed in the opposite direction to the exhaust gas passing through the static fluid mixer, the foreign substances in the exhaust gas can be eliminated with high probability.

Sixth Embodiment

Subsequently, a sixth embodiment is described as follow.

Figure 7:
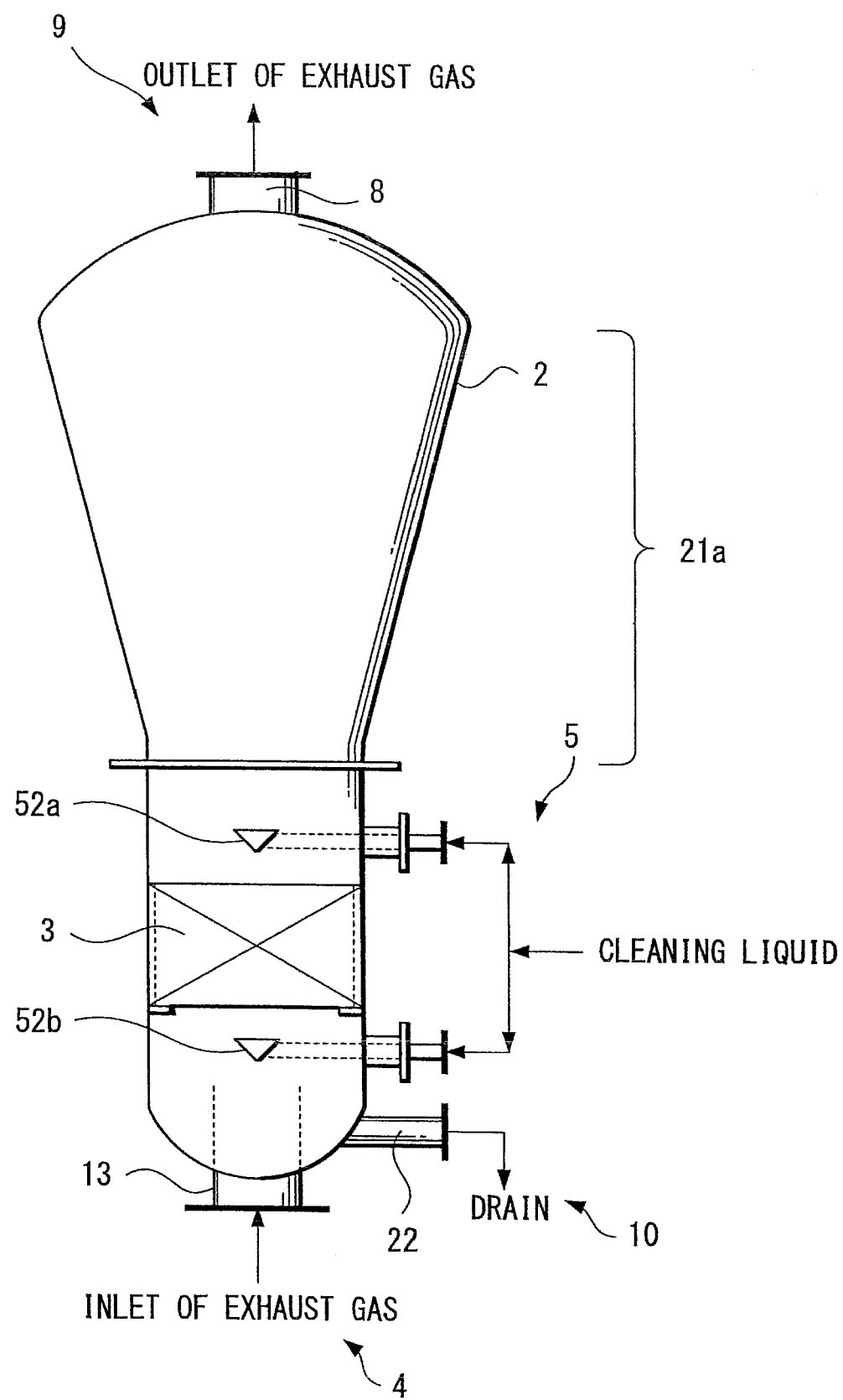
FIG. 7 is a schematic diagram illustrating a gas-liquid contact system according to still another embodiment of the invention.

FIG. 7 is a schematic diagram illustrating a gas-liquid contact system according to the sixth embodiment of the invention. In FIG. 7, parts corresponding to those of FIG. 1 are indicated by the same symbols, and description thereof is omitted.

As shown in FIG. 7, the gas-liquid contact system of the fourth embodiment has the same elements as those of the first embodiment except for differing in shape of the vessel 2. As shown in FIG. 7, the gas-liquid contact system of the sixth embodiment has a vessel 2 having a shape in which the upper part of the vessel 2 gradually increases in a radial sectional area in an upward direction of the vessel 2. Specifically, the vessel 2 has an inverted conical shape with an inverted tapered shape, and the portion with the inverted tapered shape forms the separation-drip unit 21a. The resistance between the exhaust gas and the air can be increased by increasing the volume of the separation-drip unit 21a to increase the amount of the air, thereby delaying the flow rate of the exhaust gas that passes through the separation-drip unit 21a.

According to the gas-liquid contact system of the embodiment, since the upper part of the vessel 2 has an increased radial sectional area to delay the flow rate of the gas passing therethrough, thereby delaying the flow rate of the droplets contained in the exhaust gas. Consequently, the effect of the gravity acting on the droplets contained in the exhaust gas can be increased, thereby causing to drop an increased number of droplets to the lower part of the vessel 2. Thus, the separating (collecting) efficiency of the droplets contained in the exhaust gas can be improved.

Next, a mixing element constituting another embodiment of the static fluid mixer 3 will be described in details with reference to drawings. FIG. 8A is a perspective view of a mixing element, and FIG. 8B is a top view of the mixing element according to the embodiment of the invention.

A mixing element 70 employed in the embodiment includes a cylindrical passage tube 72, and a first blade assembly having a plurality of first right-twisted spiral blades 73. The first blade 73 is formed of a porous body having a large number of pores 74. A cylindrical first internal tube 75 is placed inside of the first blade assembly having the first blades 73. The internal tube 75 includes a second blade assembly having a plurality of second right-twisted spiral blades 76, each of which is formed of a porous body having a large number of pores 2. A cylindrical second internal tube 78 is placed inside of the second blade assembly having the second blades 76, and the cylindrical second internal tube 78 includes an opening 79. The second internal tube 78 is provided to increase the mechanical strength against the torsional stress of the second blades 78. The first blade 73 is formed spirally twisted clockwise (rightward) toward an inner surface of the passage tube 72, and one end of the blade is connected to an outer surface of the internal tube 75, while the other end is connected to an inner surface of the passage tube 72.

Similarly, the second blade 76 is formed spirally twisted clockwise (rightward) toward an inner surface of the first internal tube 75, and one end of the blade is connected to an outer surface of the second internal tube 78, while the other end is connected to an inner surface of the first internal tube 72. The second internal tube 78 has an opening 79 in the axial center thereof, so that the second blades 76 are located off the axial center of the second internal tube 78; specifically, no blades are provided in the axial center of the second internal tube 78.

The twisting angle of the first blades 73 and 76 is not limited to approximately 90 degrees. The twisting angle may preferably be in a range of approximately 5 to 270 degrees, and more preferably in a range of approximately 10 to 90 degrees according to the internal diameter of the mixing element 70. The number of blades 73 and 76 is not respectively limited to 12 and 6, and the number of blades can suitably be adjusted.

Since the mixing element 70 according to the embodiment includes the spiral blades 73, 76, and the opening 79 in the center thereof, the gas introduced in the mixing element 70 can be divided into the following two types of gas: a gas having a delayed wave generated around the blade, and a gas having a straight wave generated at the opening. Thus, the gas introduced in the mixing element 70 can be divided into the different sound waves each having a different wavelength. The two types of the gas each having a different sound wave can mutually be interfered to thereby obtain silencing effect. Thus, noises such as an exhausting noise generated from the blower can be reduced in the system of the embodiment.

Figure 9A:
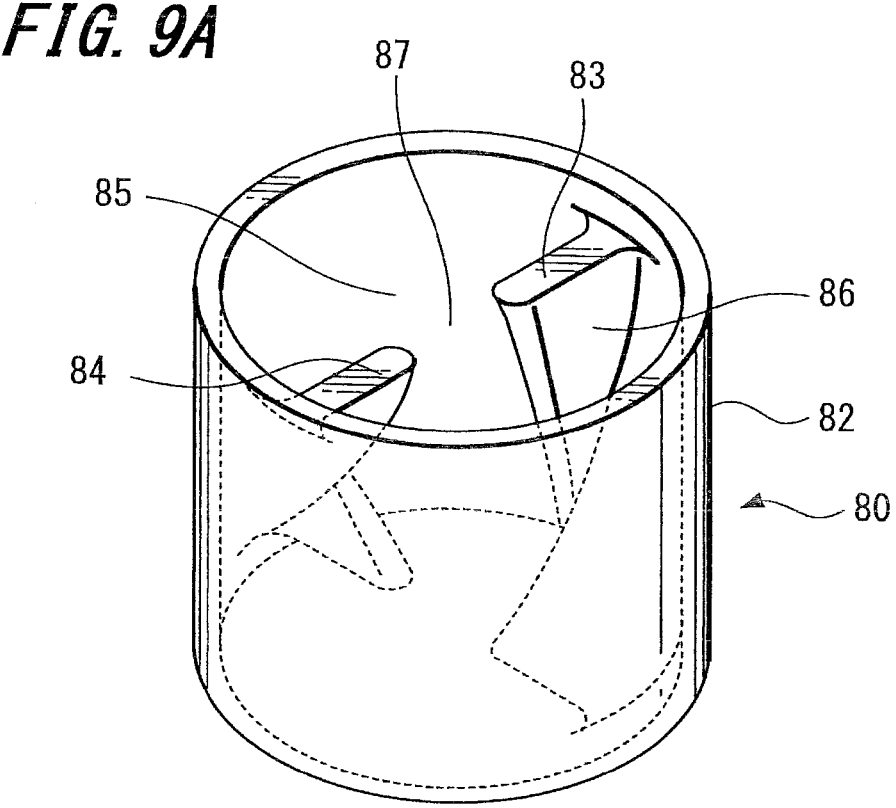
FIGS. 9A, 9B are perspective views of the mixing element shown in FIGS. 8A, 8B according to yet another embodiment of the invention.
Figure 9B:
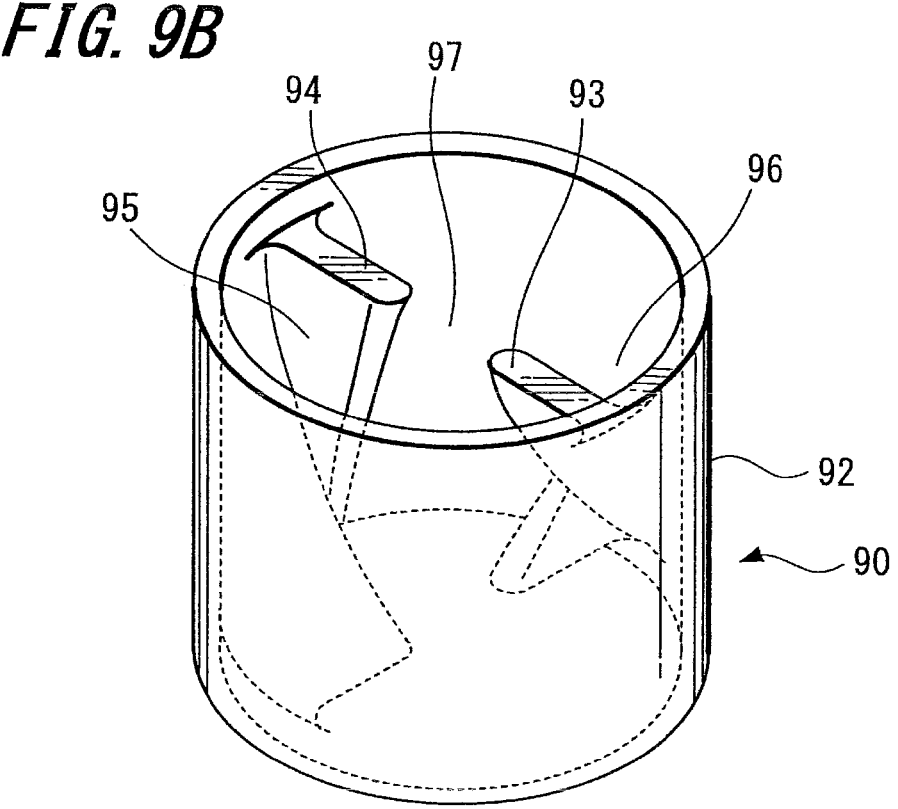

Next, a mixing element constituting still another embodiment of the static fluid mixer 3 will be described in details with reference to drawings. FIGS. 9A, 9B are perspective views of a 90 degree-twisted mixing element according to the embodiment of the invention.

Mixing elements 80 and 90 respectively includes cylindrical passage tubes 82 and 92, and spiral blades 83, 84 and 93, 74 provided in the respective passage tubes 82 and 92. The blades 83, 84 and 93, 94 are twisted approximately 90 degrees clockwise (rightward) and counterclockwise (leftward), respectively. Fluid passages 85, 86 and 95, 96 are formed by having the blades 83, 84 and 93, 94, respectively.

There are neither blades 83, 84 nor blades 93, 94 provided in the axial center of the passage tubes 82, 92. Accordingly, openings 87, 97 are formed in the in the axial center of the passage tubes 82, 92, where no blades are provided. Fluid passages 85, 86 and fluid passages 95, 96 or 15B are thus communicated along the full length of the passage tubes 82 and 92 via the openings 87 and 97.

The static fluid mixer 3 includes the mixing elements 80 and 90 alternately impacted in a cylindrical casing, and the edges of the blades 83, 84 of the mixing element 80 and the blades 93, 94 of the mixing element 90 are arranged at right angles to one another.

While two types of fluids (not shown) are mutually flowing in the opposite directions through the fluid passage of the static fluid mixer 3 configured as described above, part of the fluid is spirally twisted 90 degrees, and another part of the fluid is sheared at the opening, is then merged with the fluid passed through the other fluid passage, is further divided, and reversed. The resulting fluids are further spirally twisted 90 degrees in the opposite directions thereafter. The two types of fluids are thus mutually mixed while the fluid is being twisted, sheared, merged, divided, and reversed in the static fluid mixer 3. Alternatively, the static fluid mixer 3 may include blades twisted 180 degrees instead of those twisted 90 degrees as described in the embodiment.

The twisted angle of the blade employed in the static fluid mixer is not limited to those describe above; however, the static the twisted angle may include the blades twisted approximately 15, 30, 60, 135, 270, or 360 degrees. The static fluid mixer is not limited to those described above, and various types of static fluid mixers may suitably be utilized in the gas-liquid contact system of the embodiments.

The aforementioned gas-liquid contact system of the embodiments can suitably be utilized for treatments of exhaust gases, in semiconductor manufacturers such as CVD, in synthetic quarts manufacturers such as $SiCl_4$ or $SiH_2Cl_2$, in fiber optic cables manufacturers such as $SiO_2$ or HCl, in light emitting diodes manufacturers such as $Ga(CH_3)_3$ or $Al(CH_3)_3$, dust in metallic or nonmetallic refining industries utilizing blast furnaces and smelters, and the exhaust gas discharged from incinerators such as $So_x$ or $NO_x$.

The gas-liquid contact system according to the embodiments of the invention is not limited to the systems of the aforementioned embodiments, and it is to be understood that various changes and modifications may be effected without departing from the spirit or scope of the invention in terms of the material or structure, for example. Specifically, spray directions of the spray nozzle members may suitably be selected either in upward direction or in downward direction. The gas-liquid contact system may include a static fluid mixer having spiral blades attached to the inner-wall of the vessel. Further, the gas-liquid contact system according to the embodiments of the invention may include the first liquid supplier that supplies vaporous cleaning liquid to the static fluid mixer.

It should be understood by those skilled in the art that various modifications, combinations, sub-combinations and alterations may occur depending on design requirements and other factors insofar as they are within the scope of the appended claims or the equivalents thereof.

What is claimed is:

1. A gas-liquid contact system comprising:
 a vessel arranged approximately perpendicular to the ground in a longitudinal direction;
 a static fluid mixer in the vessel having a passage tube and a spiral blade provided in the passage tube;
 a gas supplier supplying gas having foreign substances to the static fluid mixer from a lower end of the vessel;
 a gas discharger discharging the gas passed through the static fluid mixer from an upper end of the vessel;
 a first liquid supplier supplying liquid to the static fluid mixer; and
 a liquid discharger discharging the liquid supplied from the first liquid supplier outside of the vessel, with the gas supplier including a gas generator generating gas, a pipe connecting the gas generator with the vessel, a blowing device provided in the pipe, and a second liquid supplier supplying liquid to the pipe between the gas generator and the blowing device.

2. A gas-liquid contact system according to claim 1, wherein the second liquid supplier includes a spray nozzle member supplying the liquid in a spray form or in a vaporous form in the pipe.

3. A gas-liquid contact system comprising:

a vessel arranged approximately perpendicular to the ground in a longitudinal direction;

a first static fluid mixer in the vessel having a passage tube and a spiral blade provided in the passage tube;

a gas supplier supplying gas having foreign substances to the first static fluid mixer from a lower end of the vessel;

a first liquid supplier supplying liquid to the first static fluid mixer; and a liquid discharger discharging the liquid supplied from the first liquid supplier outside of the vessel, with the gas supplier including a gas generator generating gas, a pipe connecting the gas generator with the vessel, a blowing device provided in the pipe, and a second fluid mixer in the pipe between the gas generator and the blowing device.

4. A gas-liquid contact system according to claim 3, further comprising:

a second liquid supplier supplying liquid to the pipe between the gas generator and the second fluid mixer.

5. A gas-liquid contact system according to claim 1 or 2, wherein the first liquid supplier further includes an upper spray nozzle member supplying the liquid to the static fluid mixer from the upper part of the vessel, and a lower spray nozzle member supplying the liquid to the static fluid mixer from the lower part of the vessel.

6. A gas-liquid contact system according to claim 5, wherein the nozzle of the lower spray nozzle member is arranged with facing the static fluid mixer.

7. A gas-liquid contact system according to claim 1 or 4, wherein the liquid discharger includes a pipe provided in a side-wall of the vessel.

8. A gas-liquid contact system according to claim 1 or 4, wherein the amount of the liquid supplied from the first liquid supplier to the vessel is in a range of approximately 0.1 to 20 L/m$^3$ with the liquid-to-gas ratio, based on the amount of the gas supplied from the gas supplier to the vessel.

9. A gas-liquid contact system according to claim 1 or 4, wherein the amount of the liquid supplied from the second liquid supplier to the blowing device is in a range of approximately 0.01 to 0.5 vol %, based on the amount of the gas supplied from the gas supplier to the blowing device.

10. A gas-liquid contact system according to claim 1 or 4, wherein the amount of the vaporous liquid supplied from the second liquid supplier to the blowing device is in a range of approximately 0.01 to 0.5 vol %, based on the amount of the gas supplied from the gas supplier to the blowing device.

11. A gas-liquid contact system according to claim 1 or 4, wherein the surface tension of the liquid supplied from the first liquid supplier and the second liquid supplier is approximately $73*10^{-3}$ N/m or less.

12. A gas-liquid contact system according to claim 1 or 4, wherein the liquid supplied from the first liquid supplier and the second liquid supplier contains a surfactant.

13. A gas-liquid contact system according to claim 12, wherein the content of the surfactant in the liquid supplied from the first liquid supplier and the second liquid supplier is in a range of approximately 0.001 to 5.0 wt %.

14. A gas-liquid contact system according to claim 1 or 4, wherein the vessel has an inverted tapered shape in which the upper part of the vessel gradually increases in a radial sectional area in an upward direction.

\* \* \* \* \*